Patented Apr. 14, 1931

1,801,144

UNITED STATES PATENT OFFICE

MAX ENGELMANN AND FOREST J. FUNK, OF WILMINGTON, DELAWARE, ASSIGNORS TO E. I. DU PONT DE NEMOURS & COMPANY, OF WILMINGTON, DELAWARE, A CORPORATION OF DELAWARE

MERCURY-CONTAINING DISINFECTANT AND PROCESS OF MAKING SAME

No Drawing.     Application filed April 9, 1925. Serial No. 21,771.

This invention relates to compositions comprising organic mercurials in a highly efficacious physical form, and to processes of making such compositions. Organic mercury compounds, which constitute perhaps the most effective seed disinfectants, fungicides, and insecticides, are ordinarily employed either in water solution as alkalimetal salts or in dust form. The great potency of these mercurials makes it advisable if they are to be used as dusts, to dilute them with relatively inert materials or vehicles of alkaline or neutral reaction; and this is done as a rule by mixing the finely divided inert material with the mercury compound.

Our invention may be illustrated by the following example, but it will be understood that the invention is not limtied to the details and conditions mentioned therein:—

500 parts of hydrated lime are suspended in 2000 parts of water and a solution of 50 parts of mercury acetate is slowly added under good agitation. The mercuric oxide formed by the hydrated lime is uniformly deposited on the surface of the lime particles. 30 parts of ortho-chlorophenol are put in and the suspension heated to about 80° C. for five hours. The yellowish color of the mercuric oxide slowly disappears due to the formation of the white ortho-chloro-phenol-mercury oxide which is converted to its calcium salt. The reaction is finished when the addition of sodium sulphide to a test sample fails to produce the black color of mercury sulphide. The residue is filtered off and dried. The new compound contains about 6.7% of calcium salt of the chlorophenol-mercury. These organic mercury compounds prepared in this way are stable in the presence of acetic acid. It adheres exceptionally well to seeds and foliage and gives in water a complete colloidal suspension.

The hydrated lime can be replaced by any other material which acts as an alkali of low solubility, for instance, magnesium oxide, calcium carbonate, aluminum oxide, barium carbonate, etc.; and instead of ortho-chlorophenol any other phenol, like cresol, napthol, negatively substituted phenols, etc., can be used. The proportion of organic mercurial to the vehicle can vary widely.

It will be evident from the procedure above described, that in the new disinfectant composition the organic mercury compound exists mainly as a surface layer or coating on the individual particles constituting the inert vehicle, differing in this respect from the ordinary mercury disinfectants in which particles of mercury compound are merely mingled with particles of the vehicle.

We claim:

1. A disinfecting composition comprising a finely divided solid vehicle taken from a group comprising the hydroxides, oxides and carbonates of the alkaline earth metals, associated with an organic mercury compound having disinfecting properties, and stable in the presence of acid, the mercury compound being present mainly as a coating for minute particles of said vehicle.

2. As a new disinfecting composition, a dust comprising material taken from a group including the hydroxides, oxides and carbonates of the alkaline earth metals, and an organic mercury compound having disinfecting properties and stable in the presence of acid, said mercury compound being present chiefly as a layer or deposit on minute particles of said material.

3. As a new disinfecting composition, a dust comprising material taken from a group including the hydroxides, oxides and carbonates of the alkaline earth metals, and a mercuri-phenol compound, said mercury compound being present chiefly as a layer or deposit on and having been synthesized in the presence of minute particles of said material.

4. The process of making new seed disinfectants which comprises mixing a finely divided alkaline material taken from a group including the hydroxides, oxides and carbonates of the alkaline earth metals with a solution of a mercury salt to form a deposit of mercuric oxide on the particles of alkaline material, and mixing the resulting suspension with a phenol compound at a temperature above 50° C. to convert the mercuric oxide deposit into the corresponding phenol-mercury oxide, and into a salt thereof, and then filtering off and drying the alkaline material with its mercury compound coating.

5. The process of making new seed disinfectants containing organic mercury compounds deposited on a relatively inert solid vehicle, taken from a group including the hydroxides, oxides and carbonates of the alkaline earth metals, which comprises heating mercuric oxide with an hydroxy-derivative of an aromatic hydrocarbon in the presence of said inert vehicle.

6. The process of making seed disinfectants containing organic mercury compounds deposited on a solid vehicle, taken from a group including the hydroxides, oxides and carbonates of the alkaline earth metals, which comprises heating mercuric salts with an hydroxide derivative of an aromatic hydrocarbon in the presence of said vehicle.

In testimony whereof we affix our signatures.

MAX ENGELMANN.
FOREST J. FUNK.